2 Sheets—Sheet 2.
C. VAN HAAGEN.
MECHANISM FOR REVERSING THE MOTION OF THE BEDS OF METAL PLANING MACHINES.
No. 178,209. Patented May 30, 1876.
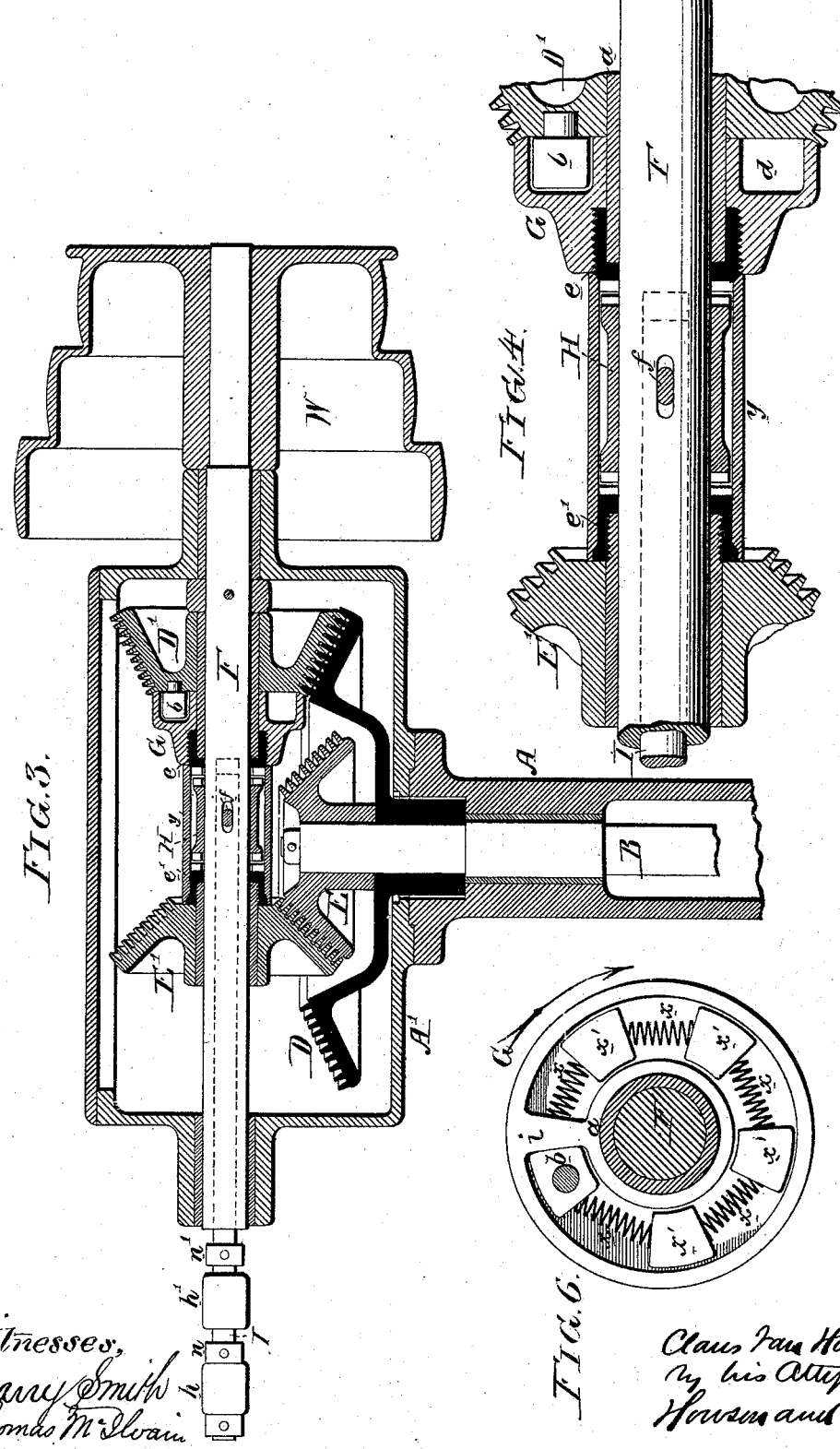

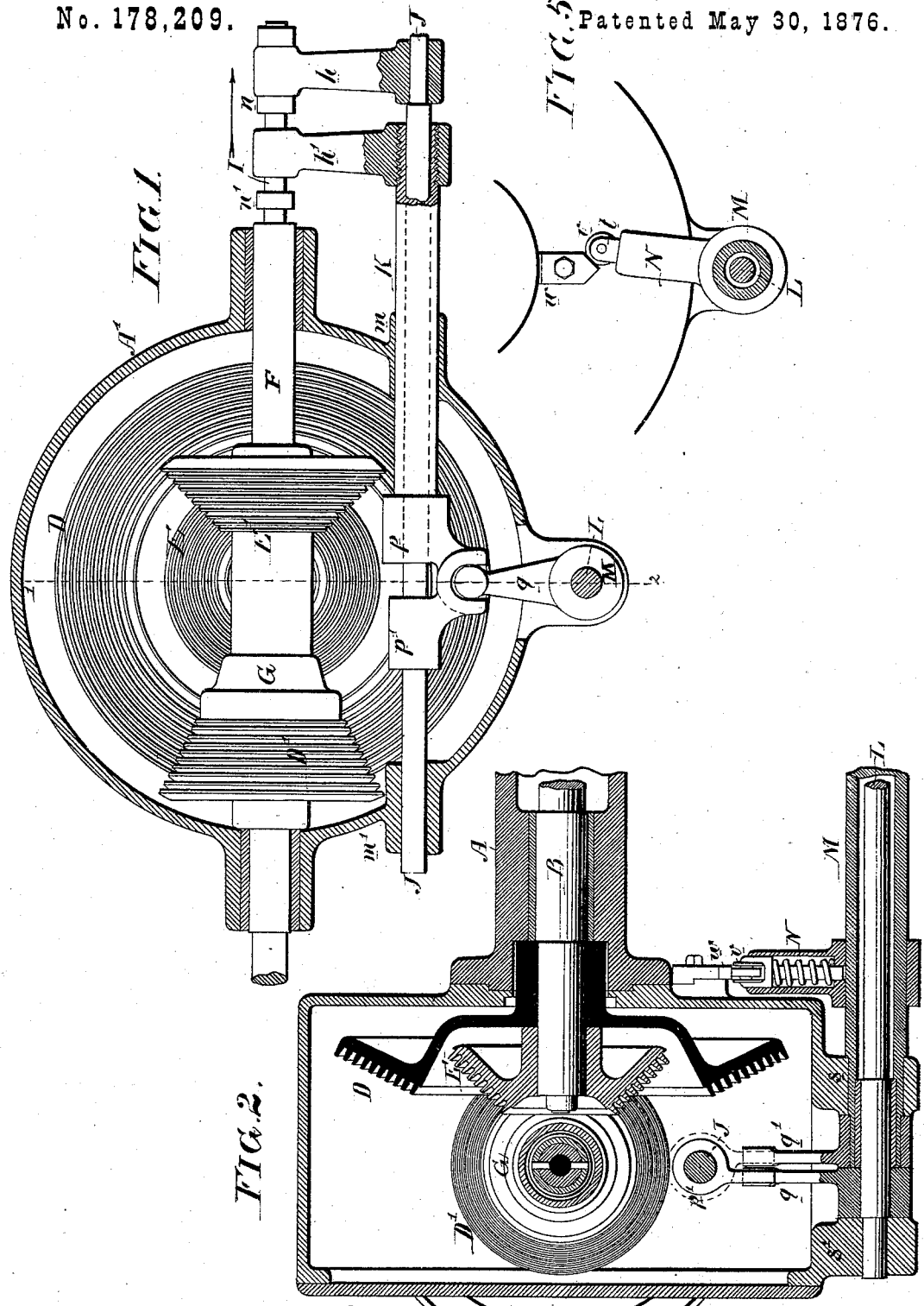

UNITED STATES PATENT OFFICE.

CLAUS VAN HAAGEN, OF PHILADELPHIA, PENNSYLVANIA, ASSIGNOR TO HIMSELF AND ANTHONY VAN HAAGEN, OF SAME PLACE.

IMPROVEMENT IN MECHANISMS FOR REVERSING THE MOTION OF THE BEDS OF METAL-PLANING MACHINES.

Specification forming part of Letters Patent No. 178,209, dated May 30, 1876; application filed May 16, 1876.

*To all whom it may concern:*

Be it known that I, CLAUS VAN HAAGEN, of Philadelphia, Pennsylvania, have invented certain Improvements in Metal-Planing Machinery, of which the following is a specification:

My invention relates to the driving and reversing gear of metal-planing machinery; and the main object of my invention is a regular and uniform reciprocating movement of the sliding bed, an object which I attain by the mechanism which I will now proceed to describe, reference being had to the accompanying drawing, in which—

Figure 1, Sheet 1, is a side view of my improved driving and reversing motion for metal-planing machines; Fig. 2, a vertical section on the line 1 2, Fig. 1; Fig. 3, a sectional plan; Fig. 4, an enlarged sectional view of part of Fig. 3; Figs. 5 and 6, detached views of parts of the machine.

A represents one of the fixed bearings for the main shaft B of a metal-planing machine, and this shaft, which extends across the permanent bed of the planer, is furnished with a friction-wheel adapted to grooves on the sliding bed, as described in the Letters Patent granted to myself and A. Van Haagen on the 18th day of June, A. D. 1872. To this main shaft B of the planer are secured the large beveled friction-wheel D and the smaller beveled friction-wheel E, the former gearing into the pinion D', and the latter into the pinion E', both pinions being loose on a shaft, F, which has its bearings in a casing, A', secured to the fixed bearing A of the shaft B, the said shaft F being furnished with a cone-pulley, $w$, for receiving a driving-belt. (See Fig. 3.) The beveled pinion D' has a bush, $a$, adapted to the shaft F, and to the face of the pinion is secured a stud, $b$, projecting into an annular recess, $d$, in the clutch-wheel G, without touching either the sides or bottom of the said recess, which will be especially referred to hereafter. Into the hub of the clutch-wheel G is screwed a steel ring, $e$, having teeth adapted to like teeth on the sliding clutch H, which is armed with teeth at both ends, and is controlled through the medium of a shaft, I, arranged within the shaft F, the latter being tubular throughout a portion of its length. A key, $f$, is driven tightly through the clutch and through the shaft I, and is arranged to slide in a slot in the tubular shaft, which insures the rotation of the clutch with the latter, but permits the said clutch to be moved to and fro freely to a limited extent. A steel ring, $e'$, similar to the ring $e$, above alluded to, is screwed onto the bush of the beveled pinion E', and this ring has teeth adapted to like teeth on the clutch. When the clutch H is in gear with the ring $e'$ a fast rearward motion will be communicated to the sliding bed of the planer through the bevel-pinion E', wheel E, and shaft B; but when the clutch is in gear with the ring $e$ a slower forward motion will be imparted to the sliding bed through the bevel-wheels D' and D, and the said shaft B. The shaft I referred to above as the medium through which the clutch is controlled, is connected, by an arm, $h$, to a sliding rod, J, which is contained within a tubular rod, K, the latter being arranged to slide in a bearing, $m$, on the casing A', and the rod J being adapted to a bearing, $m'$, on the same casing, as shown in Fig. 1.

The tubular rod K has an arm, $h'$, the outer end of which is so adapted to the shaft I that it can slide thereon to an extent limited by collars $n$ $n'$ on the said shaft. An arm, $p'$, on the rod J is adapted to the upper end of an arm, $q$, on a shaft, L, and a similar arm, $p$, on the tubular rod K' is adapted to the upper end of an arm, $q'$, on the tubular shaft M, the latter having one of its bearings in a projection, $s$, on the casing A', and the shaft L having one of its bearings on a projection, $s'$, on the same casing. (See Fig. 2.)

The tubular reversing-shaft M extends across and has its other bearing on the permanent bed of the planer, and is operated from the sliding bed, a stop on the latter turning the shaft M to a limited extent in one direction at the termination of one movement of the bed, and a similar stop on the same bed, when the latter has reached the limit of its reverse movement, turning the same shaft to a limited extent in the contrary direction.

The devices by which the sliding bed of a planing-machine is caused to operate a reversing-shaft is too well known to demand illustration in the accompanying drawings. The shaft L also extends across the permanent bed of the machine, and is furnished with a lever to be operated by hand. A tubular arm, N, best observed in Figs. 2 and 5, is secured to the reversing-shaft M, and this arm contains a sliding block, t, bearing on a spring in the arm, the block carrying a roller, v, which is caused by the said spring to bear against a pointed stud, w, secured to the permanent casing A. The object of the tube y, (shown in Figs. 3 and 4) is to maintain the pinion E' and clutch-wheel G at their proper distance apart from each other.

As shown at Fig. 4, the clutch H is in gear with neither of the pinions D' or E', and consequently the sliding bed must be stationary, the clutch having been moved to this neutral position by the hand shaft L, arm q, sliding rod J, arm h, and rod I. On moving the clutch by the same appliances into gear with the clutch-wheel G, the pinion D' must revolve with the shaft, and hence a slow forward motion must be communicated through the wheel D and shaft B to the sliding bed of the planer, until a stop on the table turns the reversing-shaft M.

The extent of the movement of this shaft by the stop must be such that the roller v, carried by arm N, Fig. 5, will just pass the point of the stud w, and during this limited movement the arm h', carried by the tubular rod K, will approach the stop n on the shaft I without disturbing the said shaft or the clutch; but the moment the roller v, carried by the arm N of the reversing-shaft M, passes the point of the stud w, Fig. 5, the spring within the said arm N, forcing the roller against the inclination of the stud, causes the arm to turn beyond the limit to which it had been moved by the positive action of the sliding bed of the planer, and this additional movement is transmitted from the shaft M through the arm q', arm p, tubular rod K, to the arm h', which, bearing against the collar n, moves the shaft I far enough in the direction of the arrow, Fig. 1, to suddenly throw the clutch H into gear with the pinion E', when a rapid reverse motion of the sliding bed must take place and must be continued until another stop on the said bed turns the shaft to a limited extent in a direction contrary to that in which it was previously turned, when the roller v, carried by the arm N, will, in conjunction with the pointed stud w, again move the clutch into gear with the clutch-wheel G, and, consequently with the pinion D, and the sliding bed of the planer will recommence its slow forward movement.

It will be observed, on reference to Fig. 6, that the continuity of the annular groove in the clutch-wheel G is interrupted by a cross-piece, i, between which and the stud b on the wheel D' intervene a series of spiral springs, x, alternating with sliding blocks x'. When the clutch H is thrown into gear with the clutch-wheel G, the latter turns in the direction of the arrow, Fig. 6; hence the motion of the clutch-wheel must be transmitted to the wheel D through the elastic medium which intervenes between the cross-piece i and the stud b, and this elastic medium absorbs the shock consequent upon the sudden reversing of the bed of the planer, and at a time when its slow motion suddenly ceases, and its quick motion as suddenly commences. This is an important feature of my invention, as it insures the prompt and decisive engagement of the teeth of the clutch into those of the clutch-wheel G, and prevents the wear and tear of parts which would necessarily occur in the absence of the cushion contained in the clutch-wheel. The same cushioning arrangement may be applied to the pinion E'. Blocks of rubber may be substituted for the spiral spring; but I prefer the latter, as they have been found most serviceable in practice. Although I have shown and described friction-wheels as the medium through which motion is communicated from the driving to the main shaft, and although I prefer these wheels, the devices used in connection therewith may be retained if ordinary cog-wheels are substituted for the friction-wheels shown.

I claim as my invention—

1. The combination, in a planing-machine, of the main shaft B, friction-wheels D E, friction-pinions D' E', intervening clutch H, and the reversing-shaft M, operated from the table of the machine, all as specified.

2. The casing A' secured to the permanent bearing A of the shaft B, and having bearings for the driving-shaft F, as specified.

3. The combination of the clutch-wheel G and its elastic cushion with the stud b on the wheel D', and with the clutch H, as set forth.

4. The steel rings e and e', attached one to each of the pinions E' and D', and having teeth adapted to those of the clutch, all as set forth.

5. The reversing-shaft M, its arm N, and the fixed stud w, in combination with the clutch-controlling shaft I, its stop-collars n n', and arm h', and intervening mechanism, substantially as described.

6. The combination of the hand-shaft L, with the clutch-controlling shaft I and intervening mechanism, substantially as described, whereby the movement of the shaft h is transmitted to the said shaft I.

7. The combination of the tubular reversing-shaft M, the internal hand-shaft L, sliding rods K and J, and connections, substantially as described, between the said shafts and rods.

In testimony whereof I have signed my name to this specification in the presence of two subscribing witnesses.

C. VAN HAAGEN.

Witnesses:
WM. A. STEEL,
HARRY SMITH.